United States Patent
Uchiyama et al.

(10) Patent No.: US 7,209,155 B2
(45) Date of Patent: Apr. 24, 2007

(54) PRINTER DEVICE

(75) Inventors: Hiroyuki Uchiyama, Saitama-ken (JP); Mutsumi Naruse, Saitama-ken (JP); Soichiro Kimura, Saitama-ken (JP)

(73) Assignee: FujiFilm Corporation, Tokyo (JP)

( * ) Notice: Subject to any disclaimer, the term of this patent is extended or adjusted under 35 U.S.C. 154(b) by 900 days.

(21) Appl. No.: 10/347,750

(22) Filed: Jan. 22, 2003

(65) Prior Publication Data

US 2003/0137642 A1   Jul. 24, 2003

(30) Foreign Application Priority Data

Jan. 23, 2002  (JP) .............................. 2002-014129
Oct. 10, 2002  (JP) .............................. 2002-297077

(51) Int. Cl.
*B41J 2/44* (2006.01)

(52) U.S. Cl. ....................................... 347/131; 347/136
(58) Field of Classification Search ................ 347/129, 347/130–136

See application file for complete search history.

(56) References Cited

U.S. PATENT DOCUMENTS 6,281,923 B1 * 8/2001 Yamada et al. ............. 347/239

FOREIGN PATENT DOCUMENTS

| JP | 05-268436 | 10/1993 |
| JP | 10-272804 | * 10/1998 |
| JP | 11-215456 | 8/1999 |
| JP | 2000-280527 | 10/2000 |
| JP | 201-063176 | 3/2001 |

* cited by examiner

*Primary Examiner*—Huan Tran
(74) *Attorney, Agent, or Firm*—Sughrue Mion, PLLC

(57) ABSTRACT

Temperature is detected by a temperature sensor disposed near a recording head. When the detection result is a temperature that is higher than room temperature, an appropriate movement amount of the recording head is calculated from a relation between response speed of the temperature sensor and a LED light amount, and a moving speed of the recording head is controlled. When the result of the detection by the temperature sensor is a temperature that is lower than room temperature, an appropriate exposure amount is calculated from the relation between the response speed of the temperature sensor and the LED light amount, and the amount of light emitted by LEDs is controlled.

11 Claims, 15 Drawing Sheets

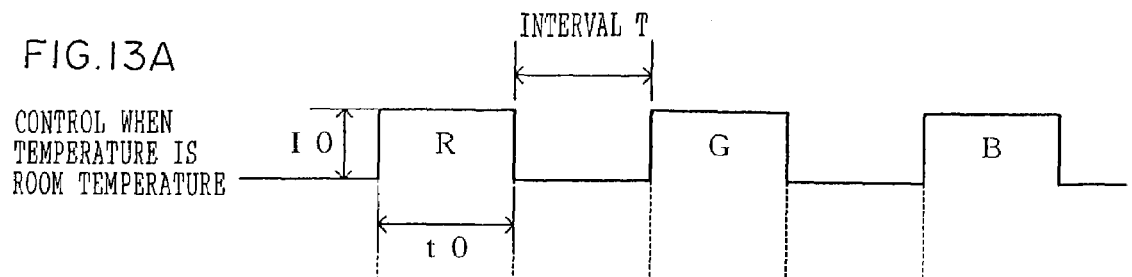
FIG.13A CONTROL WHEN TEMPERATURE IS ROOM TEMPERATURE
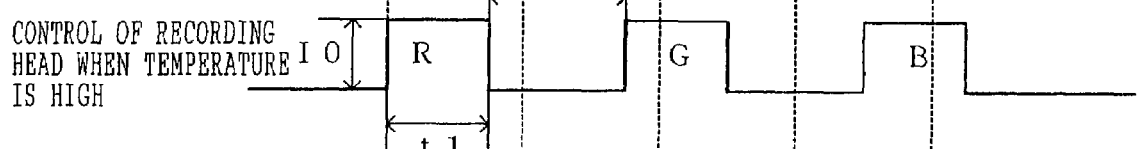
FIG.13B CONTROL OF RECORDING HEAD WHEN TEMPERATURE IS HIGH
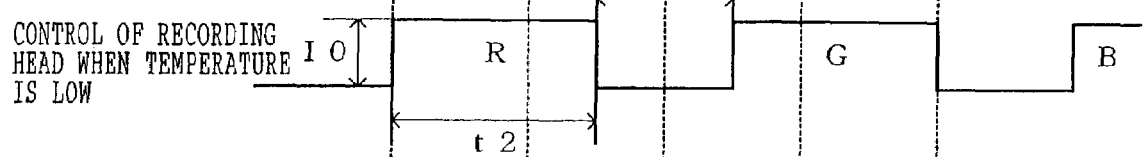
FIG.13C CONTROL OF RECORDING HEAD WHEN TEMPERATURE IS LOW
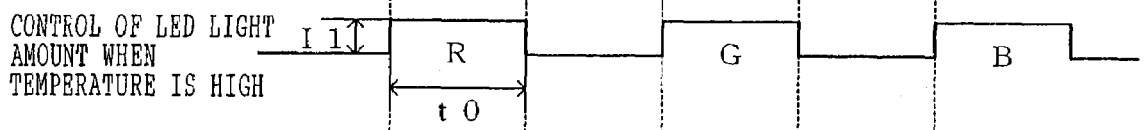
FIG.13D CONTROL OF LED LIGHT AMOUNT WHEN TEMPERATURE IS HIGH
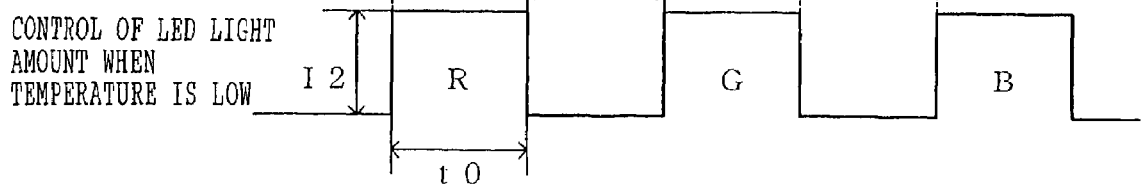
FIG.13E CONTROL OF LED LIGHT AMOUNT WHEN TEMPERATURE IS LOW

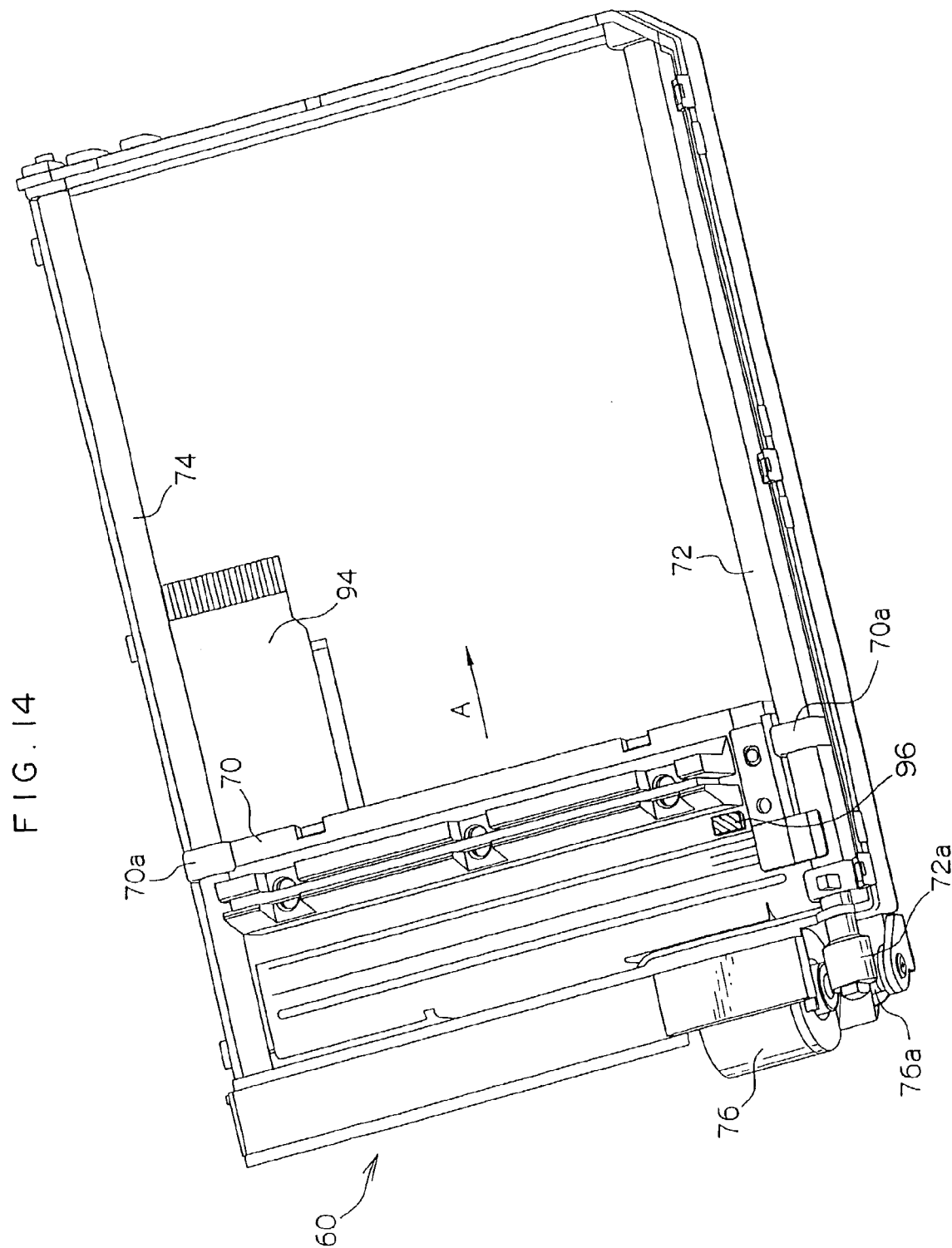

PRINTER DEVICE

BACKGROUND OF THE INVENTION

1. Field of the Invention

The present invention relates to a printer device, and particularly to a printer device that is disposed in a digital camera and prints images shot by the digital camera on a photosensitive material such as photographic printing paper.

2. Description of the Related Art

Printer devices employ a system in which an image is recorded on a thermal recording material using a thermal recording head or a system in which an image is recorded on a photosensitive material by exposure to light using a recording head that irradiates light.

As a thermal printer device, the technology disclosed in Japanese Patent Application Laid-open Publication (JP-A) No. 5-268436 (Patent Document 1) has been proposed. In the technology disclosed in Patent Document 1, an image is recorded on a photosensitive material by detecting the temperature of a recording head with a thermistor, controlling the temperature of the recording head on the basis of the detected temperature, and scanning the recording head, whereby it is possible to scan the photosensitive material at a proper temperature.

As a light exposure printer device, the technology disclosed in JP-A No. 2000-280527 (Patent Document 2) has been proposed. In the technology disclosed in Patent Document 2, an image is recorded by irradiating a photosensitive recording medium with light from a LED via a liquid-crystal shutter and controlling exposure/non-exposure (i.e., whether or not to expose a region on the recording medium) with the liquid-crystal shutter.

In the technology disclosed in JP-A No. 2001-63176 (Patent Document 3), a printer device that includes recording means for forming an image on recording media, a cassette that houses the recording media, paper supply means for removing the recording media one sheet at a time from the cassette, and conveyance means for conveying the recording media has been proposed in which the relative positions of the recording media and the recording means and the conveyance means are displaced in the direction in which the recording media are conveyed. In this printer device, scanning is effected and an image is recorded on the recording media by the displacement of the relative positions of the recording media and the recording means and the conveyance means.

As a printer device that prints an image shot by a digital camera on a photosensitive material such as photographic printing paper, an electronic camera disposed with a printer has been proposed in JP-A No. 11-215456 (Patent Document 4).

However, with a thermal recording head, even if temperature is detected, when consideration is given to excessive heat and balance with media such as photosensitive material, it is difficult to control the recording head temperature and control the speed at which the recording head moves for improving photographic printing speed.

There has also been the problem that, in printer devices using a light-exposure recording head in which exposure/non-exposure is controlled using a liquid-crystal shutter as in the technology disclosed in Patent Document 2, response speed of the liquid-crystal shutter varies due to atmospheric temperature, whereby it is not possible to obtain a proper exposure amount.

SUMMARY OF THE INVENTION

In view of the aforementioned facts, it is an object of the invention to provide a printer device that can expose at a proper exposure amount.

In order to achieve this object, a first aspect of the invention is a printer device comprising: a recording head including a light source for irradiating a photosensitive material with light and a shutter disposed between the light source and the photosensitive material for controlling irradiation of the light with respect to the photosensitive material on the basis of image data representing an image; a moving section for relatively moving the recording head and the photosensitive material; a detection section for detecting a temperature of the shutter; and a control section for controlling at least one of the amount of light irradiated by the light source and a movement amount by the moving section on the basis of the detection result of the detection section.

A second aspect of the invention is a printer device comprising: a recording head including a light source for irradiating a photosensitive material with light and a shutter disposed between the light source and the photosensitive material for controlling irradiation of the light with respect to the photosensitive material on the basis of image data representing an image; a moving section for relatively moving the recording head and the photosensitive material; a detection section for detecting a temperature in a vicinity of the recording head; and a control section for controlling at least one of the amount of light irradiated by the light source and a movement amount by the moving section on the basis of the detection result of the detection section.

According to the first and second aspects of the invention, the light irradiated by the light source is irradiated onto the photosensitive material via the shutter. At this time, exposure corresponding to an image is conducted by controlling the shutter in correspondence to image data representing the image, whereby it becomes possible to form an image on the photosensitive material.

The moving section relatively moves the recording head and the photosensitive material, and an image is scan-exposed onto the photosensitive material by this relative movement. The moving section may be configured to move the recording head with respect to the photosensitive material or configured to move the photosensitive material with respect to the recording head.

Additionally, it is possible to expose an image onto the photosensitive material at an appropriate exposure amount by controlling the light source to emit light so that the amount of light emitted becomes a predetermined amount of light necessary for exposure, controlling the shutter in correspondence to image data representing the image, and controlling the amount of relative movement between the recording head and the photosensitive material.

However, as described above, there is a problem in that it becomes impossible to obtain a proper exposure amount due to response speed of the shutter varying as a result of atmospheric temperature.

Thus, in the first aspect of the invention, the temperature of the shutter is detected by the detection section, and at least one of the amount of light irradiated by the light source and the amount of relative movement between the recording head and the photosensitive material due to the moving section is controlled by the control section on the basis of the detection result. In the second aspect of the invention, the temperature in the vicinity of the recording head is detected by the detection section, and at least one of the amount of light irradiated by the light source and the amount of relative movement between the recording head and the photosensitive material due to the moving section is controlled by the control section on the basis of the detection result. Namely, in the first and second aspects of the invention, it is possible to expose the photosensitive material at a proper exposure amount by correcting variations in the exposure amount that are dependent upon the response speed of the shutter that changes depending on temperature, by changing at least one of the amount of light irradiated from the light source and the relative movement between the recording head and the photosensitive material.

In a third aspect of the invention, the control section controls the amount of light irradiated by the light source so that the amount irradiated by the light source is increased when the detection result of the detection section is smaller than a predetermined range (e.g., when the temperature is less than room temperature), because the response speed of the shutter becomes slow and the amount of light becomes insufficient, whereby proper exposure is conducted without lowering exposure speed (moving speed of the moving section). The control section also quickly controls the moving speed of the moving section when the detection result of the detection section is greater than the predetermined range (e.g., when the temperature is higher than room temperature), because response speed of the shutter becomes fast and the amount of light becomes larger, whereby proper exposure is conducted and it is possible to improve exposure speed.

In a fourth aspect of the invention, because the movement amount of the moving section at the light amount necessary for exposure can be calculated using the result of the detection by the detection section from a relation between the amount of light irradiated by the light source and the response speed of the shutter corresponding to temperature, the control section may be configured to control at least one of the movement amount by the moving section and the amount of light irradiated by the light source on the basis of that relation.

In the invention of the first aspect, the detection section may be configured to directly detect the temperature of the shutter or to indirectly detect the temperature of the shutter. When the temperature of the shutter is detected indirectly, the detection section may be configured to detect a temperature in the vicinity of the shutter, a temperature of the recording head, or a temperature inside the printer device.

The printer device of the invention may be applied to a camera. Namely, the printer device of the invention may be disposed in a camera that includes an electronic imaging section having a solid-state image sensing device and obtaining image data by imaging a photographed subject on the solid-state image sensing device and records an image on a photosensitive material on the basis of image data obtained by the electronic imaging section.

Additionally, in the above-described camera disposed with the printer device of the invention, the photosensitive material may be photographic film of the type that is discharged after being irradiated with exposure light and developed with developing solution as the photographic film is being discharged.

Further, a fifth aspect of the present invention is a printer device comprising: a recording head including a light source for irradiating an object to be irradiated with light and a shutter disposed between the light source and the object to be irradiated with light for controlling irradiation of the light with respect to the object to be irradiated on the basis of image data representing an image; a detection section for detecting at least one of a temperature of the shutter and a temperature in a vicinity of the recording head; and a control section for controlling an amount of light irradiated on the object to be irradiated by the light source on the basis of the detection result of the detection section.

BRIEF DESCRIPTION OF THE DRAWINGS

FIGS. 13A to 13E are timing charts showing operational timing of the liquid-crystal shutter at times when only a moving speed of the recording head moves is controlled and at times when only a LED light amount is controlled;

FIG. 14 is a view showing an example in which a temperature sensor is disposed on the recording head;

DESCRIPTION OF THE PREFERRED EMBODIMENT

An example of an embodiment of the invention will be described in detail below with reference to the drawings. The embodiment is one in which the printer device of the invention is housed in a camera.

Figure 1:
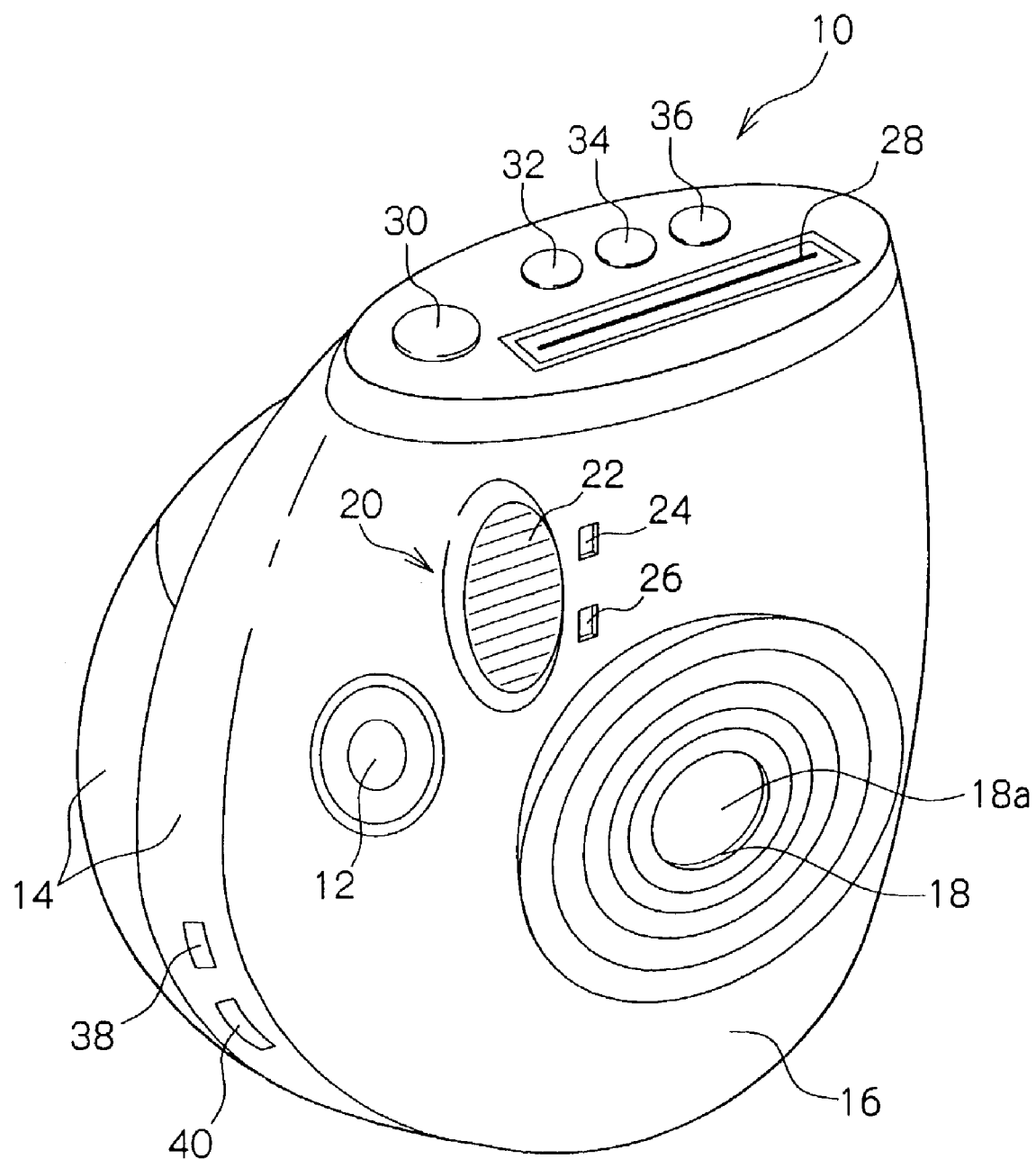
FIG. 1 is an oblique perspective view showing an outward exterior of a camera pertaining to an embodiment of the invention.

FIG. 1 shows an exterior of a camera 10 pertaining to an embodiment of the invention.

The camera 10 pertaining to the present embodiment illustrated in FIG. 1 comprises an electronic imaging section, which includes a solid-state image sensing device and obtains image data by imaging a photographed subject on the solid-state image sensing device, and an exposure section, which irradiates an exposure surface of a film sheet, which is to be irradiated with light, with exposure light on the basis of the image data obtained in the electronic imaging section.

As shown in FIG. 1, the camera 10 includes a main cover 14 and a front cover 16 that, together with the main cover 14, forms the exterior of the camera 10.

A lens aperture 18 is disposed at a center of a front surface of the camera 10, and a lens barrier 18a is disposed at a front end of the lens aperture 18. A release switch 12 is disposed at a right side (the left side in FIG. 1) on the front surface of the camera 10. A flash unit 20 that includes a protector 22 on a front surface thereof is disposed at an upper left side of the release switch 12. A flash sensor window 24, for guiding flash light to a flash sensor that detects the amount of flash light that has been reflected by a photographed subject and returned when a flash has been emitted, and an AE sensor window 26, for guiding light to a housed AE sensor, are disposed at a left side of the flash unit 20.

A discharge outlet 28 for discharging a developed film sheet outside of the camera 10 is disposed on a top of the camera 10. Also disposed on the top of the camera 10 are, in order from the left side of FIG. 1, a display 30 for displaying the remaining number of unexposed film sheets and the like, a power switch 32, a zoom switch 34, and a switch 36 for correcting brightness.

A Universal Serial Bus (USB) terminal 38, to which a USB cable may be connected for sending image data stored in a RAM (described later) to the outside, and a mobile phone terminal 40, which is used when connecting the camera 10 to a mobile phone when image data stored in the RAM is sent to the outside using a mobile phone, are disposed at a lower part of the camera 1O.

Figure 2:
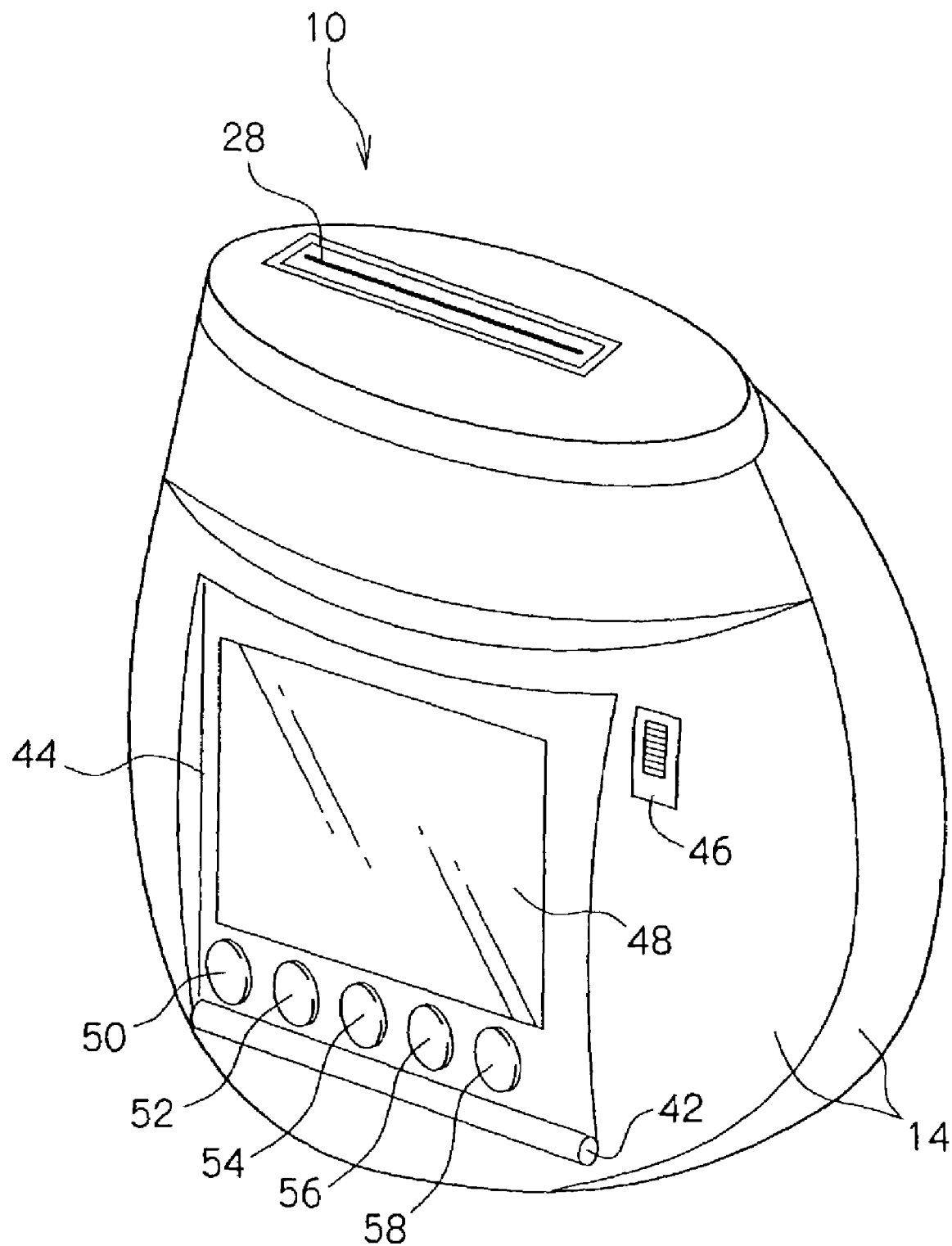
FIG. 2 is an oblique perspective view showing an exterior of a rear surface of the camera pertaining to the embodiment of the invention.

FIG. 2 shows an exterior of a rear surface of the camera 10.

A back cover 44, which is pivotally supported at the main cover 14 by a shaft 42 so as to be swingable, is disposed at a rear surface of the main cover 14 of the camera 10. FIG. 2 illustrates the camera 10 in a state in which the back cover 44 is closed by a locking mechanism (not illustrated) that locks with the main cover 14.

A release button 46 for releasing the locking with the locking mechanism (not illustrated) is disposed on the main cover 14 near (the right side in FIG. 2) the back cover 44. Release of the locking between the back cover 44 and the locking mechanism is conducted by pushing the release button 46 down. Although not illustrated, a loading chamber, into which a film pack having instant photographic film sheets stacked therein is loaded, is disposed inside the camera 10. The film pack is loaded and unloaded by opening the back cover 44 shown in FIG. 2.

An image display screen 48 is disposed on the back cover 44. The image display screen 48 is used as an electronic viewfinder. Disposed beneath the image display screen 48 are a print mode selection switch 50 for selecting whether to print immediately after shooting or print by operating a print switch 54 (described later), a mode selection switch 52 for selecting modes such as a shooting mode for shooting and a display mode for displaying a stored image, a print switch 54 for printing out an image selected in a playback mode, an image switching/playback image selection switch 56 for switching the display on the image display screen 48 and selecting playback images, and a data addition switch 58 that is operated when adding dates or messages to playback images selected with the image switching/playback image selection switch 56.

Figure 3:
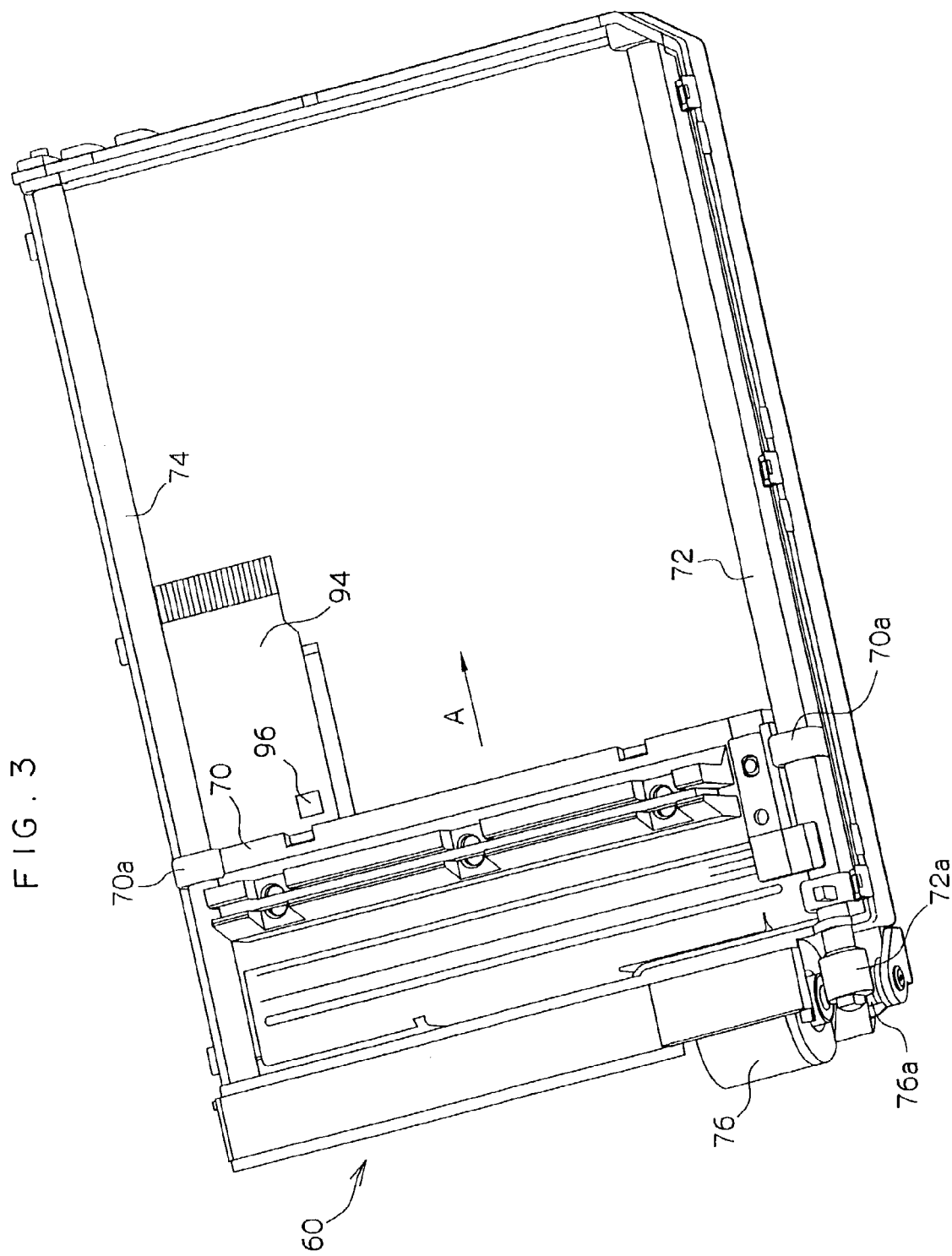
FIG. 3 is an oblique perspective view showing a printer device housed in the camera pertaining to the embodiment of the invention.
Figure 4:
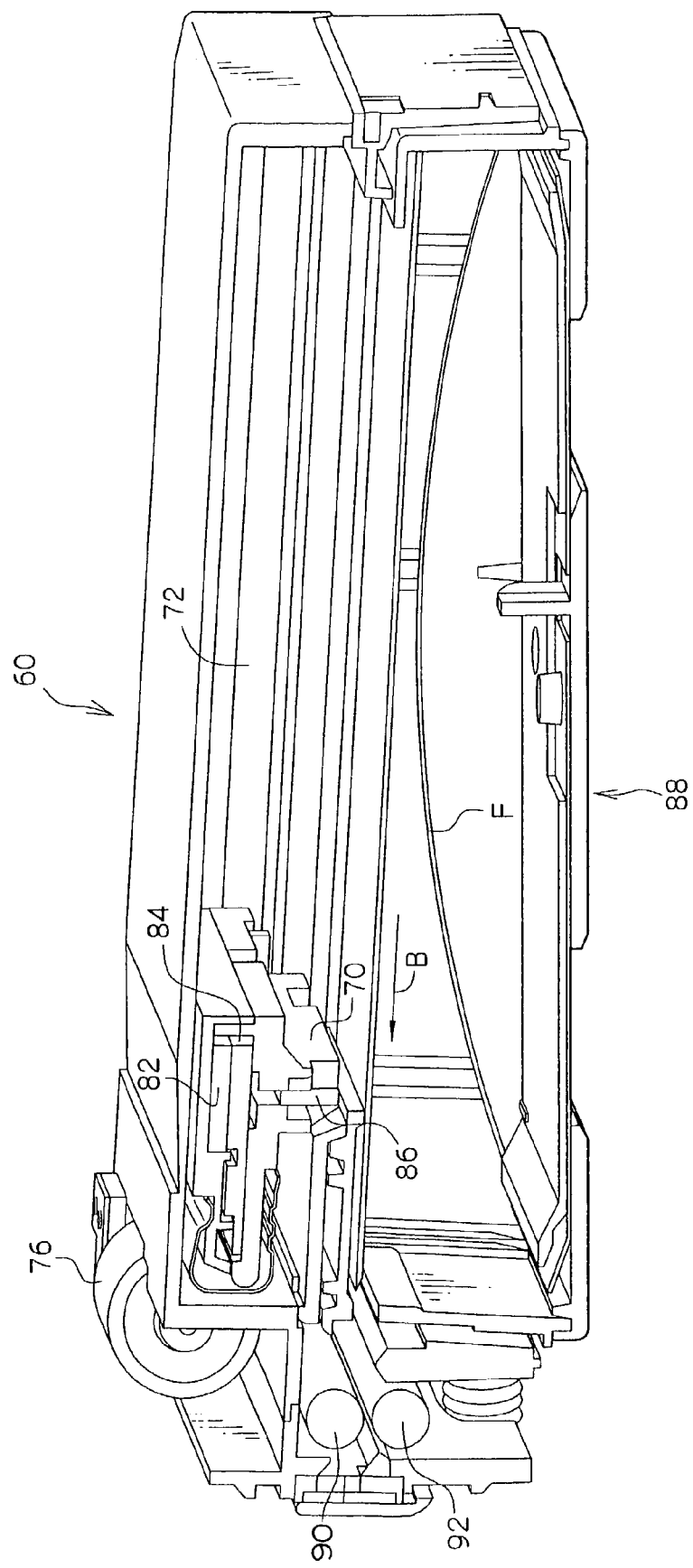
FIG. 4 is a cross-sectional oblique perspective view showing the printer device housed in the camera pertaining to the embodiment of the invention.

FIGS. 3 and 4 show a printer device 60 that is disposed inside the camera 10 and pertains to the embodiment of the invention.

As shown in FIGS. 3 and 4, the printer device 60 includes a recording head 70. As shown in FIG. 3, the recording head 70 is guided on a pair of guide rods 72 and 74 and is moveable in the direction of arrow A. The guide rod 72 is threaded, and a guide rod support 70a of the recording head 70 is fitted into thread grooves thereof. A gear 72a is disposed at an end of the guide rod 72, and the gear 72a meshes with a gear 76a disposed on a rotating shaft of a head-moving motor 76. Namely, the guide rod 72 is rotated by rotation of the head-moving motor 76, whereby the recording head 70 is moved in the direction of arrow A along the threads of the guide rod 72. The guide rods 72 and 74, the guide rod support 70a, the gears 72a and 76a, and the head-moving motor 76, all being for moving the recording head 70, correspond to a moving section of the invention.

Figure 5:
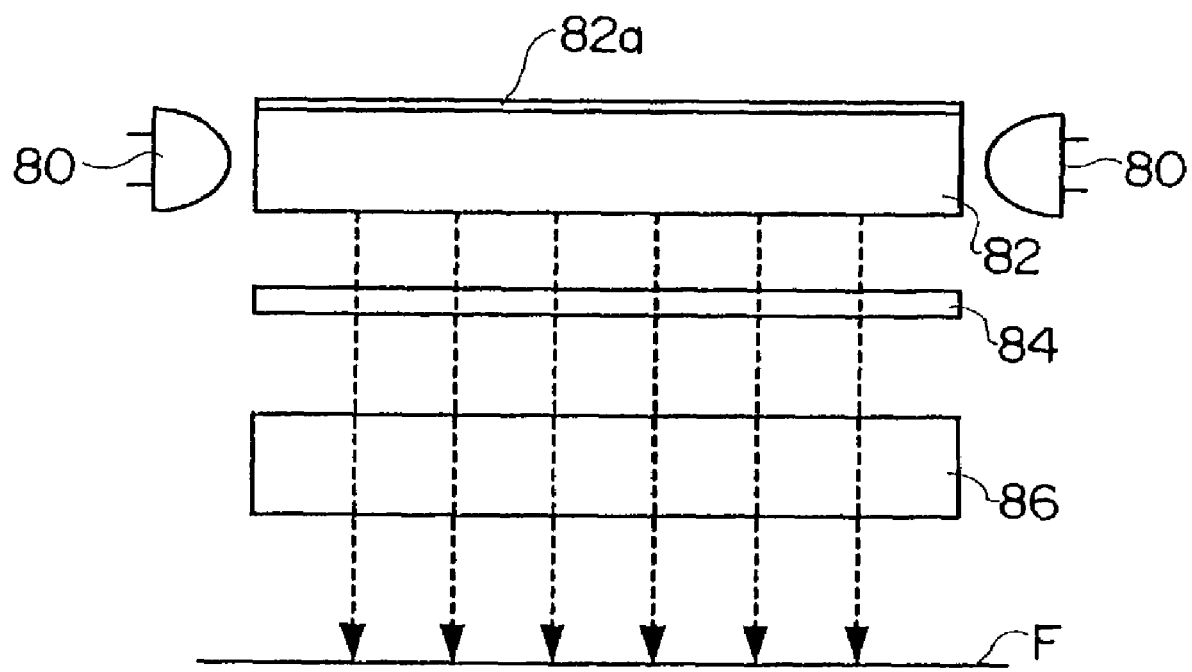
FIG. 5 is a pattern diagram showing the structure of a recording head.

As shown in FIG. 5, the recording head 70 comprises LEDs 80 that serves as a light source, a waveguide member 82, a liquid-crystal shutter 84, and a lens array 86. The LEDs 80 are disposed at both sides (both ends of the recording head 70 in a direction orthogonal to the direction in which the recording head 70 moves) of the waveguide member 82, include LEDs that emit light for each of the colors red (R), green (G) and blue (B), and emit light towards the waveguide member 82. A light-shielding member 82a is disposed at the waveguide member 82 opposite from an exposure surface of the waveguide member 82. Light emitted from the LEDs 80 is irradiated only on the exposure surface. The liquid-crystal shutter 84 and the lens array 86 are successively disposed at the exposure surface of the waveguide member 82. Light irradiated from the waveguide member 82 is irradiated on a film sheet F through the liquid-crystal shutter 84 and the lens array 86.

It should be noted that, an organic field emission element (so-called organic electroluminescence (EL)) that uses a fluorescent organic substance on a light-emitting layer may be used in place of the light source LEDs 80, the waveguide member 82, and the light-shielding member 82a. Namely, the recording head 70 may also be configured to comprise a superimposed organic EL, the liquid-crystal shutter 84 and the lens array 86.

As shown in FIG. 4, a film pack 88 having film sheets F stacked therein is housed at the exposure surface side of the recording head 70. As shown in FIG. 4, the film sheets F are housed in the film pack 88 in a curved state. When exposure by the recording head 70 is finished, the film sheets F are discharged one sheet at a time in the direction of arrow B by a cloak pawl (not illustrated) and discharged from the camera 10 body due to rotation of a pair of rollers 90 and 92. The film sheet F is a photographic film of the type in which a photograph developed by developing solution as the film sheet F is being discharged from the camera 10 appears.

As shown in FIG. 3, a flexible printed circuit (FPC) 94 for electrical connection to the camera 10 is disposed at the recording head 70. A temperature sensor 96 for detecting the temperature of the atmosphere surrounding the recording head 70 is disposed on the FPC 94.

Figure 6:
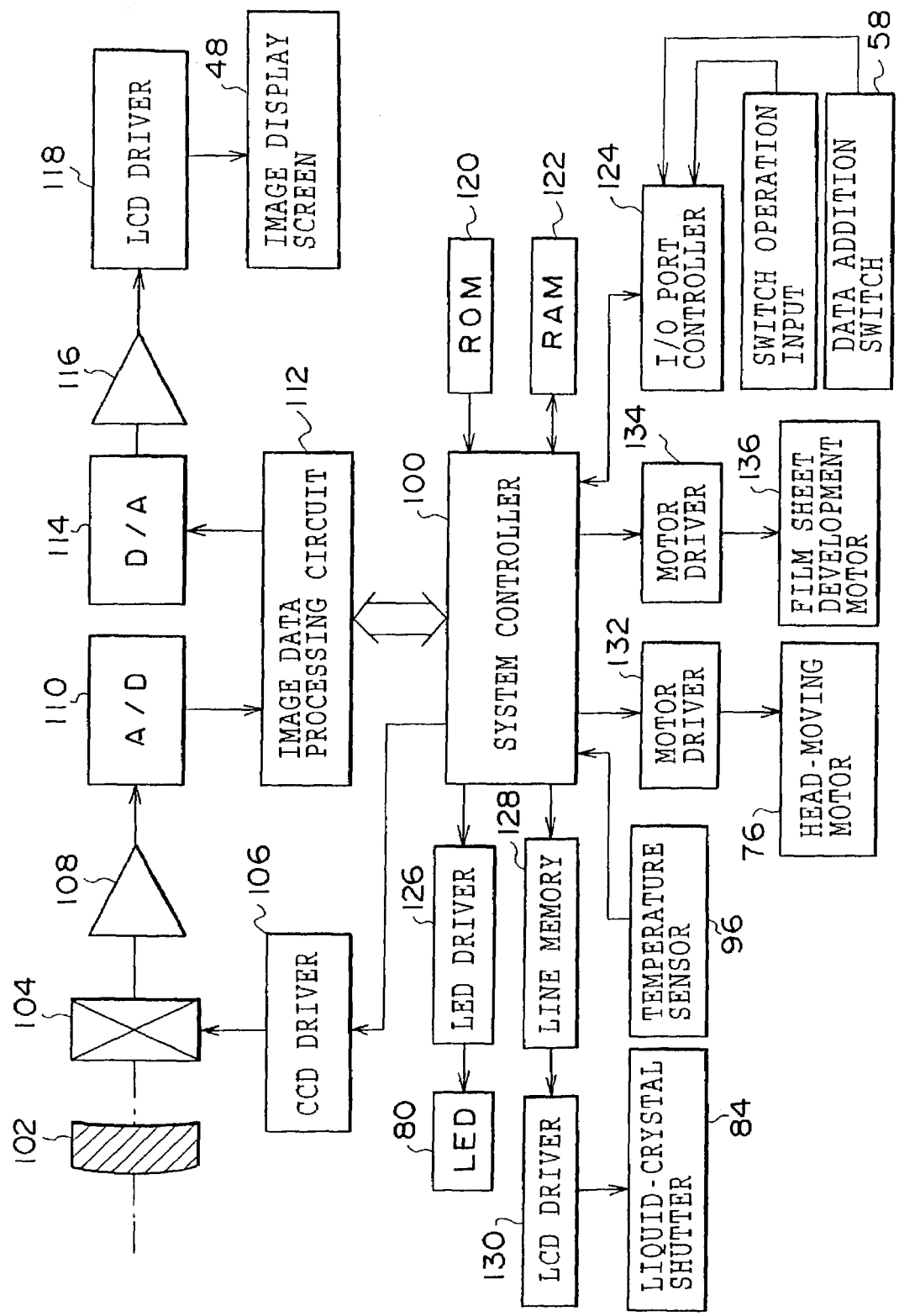
FIG. 6 is a block diagram showing the internal structure of the camera pertaining to the embodiment of the invention.

FIG. 6 is a diagram showing the internal structure of the camera 10 of the present embodiment.

As shown in FIG. 6, a system controller 100 that serves as a control section for controlling the entire camera 10 is disposed in the camera 10. A charge coupled device (CCD) image pickup device 104 that images a photographed subject through an imaging lens 102 is driven by an instruction from the system controller 100. Also disposed in the camera 10 are a CCD driver 106, which causes the CCD image pickup device 104 to output an image signal representing an image of the photographed subject, an amplifier 108 that amplifies the outputted image signal, and an A/D conversion circuit 110 that converts the image signal amplified by the amplifier 108 into image data.

Also disposed in the camera 10 are an image data processing circuit 112 that processes the image data sent from the A/D conversion circuit 110, a D/A conversion circuit 114 that converts the image data processed by the image data processing circuit 112 into an analog signal, an amplifier 116 that amplifies the analog signal converted by the D/A conversion circuit 114, and a LCD driver 118 that causes the analog signal outputted from the amplifier 114 to be displayed as an image on the image display screen 48.

The camera 10 is also disposed with a ROM 120, in which is stored various control data referenced by the system controller 100 when the camera 10 is activated, and a RAM 122, in which is stored image data obtained from the image data processing circuit 112 by a recording instruction from the system controller 100 in association with the pushing-down of the release switch 12. Moreover, data that is set by operation of the data addition switch 58, received through an I/O port controller 124, and represents dates or messages is associated with predetermined image data selected when the data addition switch 58 is operated, and that data is also stored in the RAM 122. It should be noted that input by operation of the other switches is also observed in the I/O port controller 124.

Additionally, a LED driver 126, which causes the LEDs 80 of the R, G and B colors to emit light by an instruction from the system controller 100, is disposed in the camera 10. Also disposed are a line memory 128, which stores for each of the R, G and B colors the data stored in the RAM 122, and a LCD driver 130, which controls the liquid-crystal shutter 84 that actually irradiates the film sheet F with exposure light on the basis of data sent from the line memory 128 by an instruction from the system controller 100. Namely, by causing the LEDs 80 of the R, G and B colors to emit light and controlling the liquid-crystal shutter 84 on the basis of data sent from the line memory 128, the recording head 70 controls exposed/non-exposed portions on the film sheet F and irradiates the film sheet F with light corresponding to an image. Moreover, scan-exposure of the exposure surface is conducted by the head-moving motor 76 being driven by the control of the motor driver 32, whereby the recording head 70 is moved in the direction of arrow A in FIG. 3.

Also, by the driving of a film sheet development motor 136 by the control of the motor driver 134, the cloak pawl (not illustrated) is operated and the pair of rollers 90 and 92 is driven, whereby the exposed film sheet F is discharged from the film pack 88 and discharged outside the camera 10 by the rotation of the pair of rollers 90 and 92.

The temperature in the vicinity of the recording head 70 is detected by the temperature sensor 96 and outputted to the system controller 100. The system controller 100 calculates changes in the amount of exposure due to changes in response speed of the liquid-crystal shutter 84 corresponding to the temperature, and informs the motor driver 132 of the movement amount of the recording head 70. Alternatively, the system controller 100 informs the LED driver 126 of the calculated exposure amount changes. The relation between the response speed of the liquid-crystal shutter 84 corresponding to the temperature and the exposure amount is stored in advance in the ROM 120, and the system controller 100 reads out the relation between the response speed and the exposure amount from the ROM 120 and calculates the movement amount of the recording head 70, which becomes a proper exposure amount, or the emission amount of the LEDs 80. It should be noted that the temperature sensor 96 corresponds to the detection section of the invention.

Operation of the camera 10 configured as described above will now be described with reference to the flow chart of FIG. 7.

Figure 7:
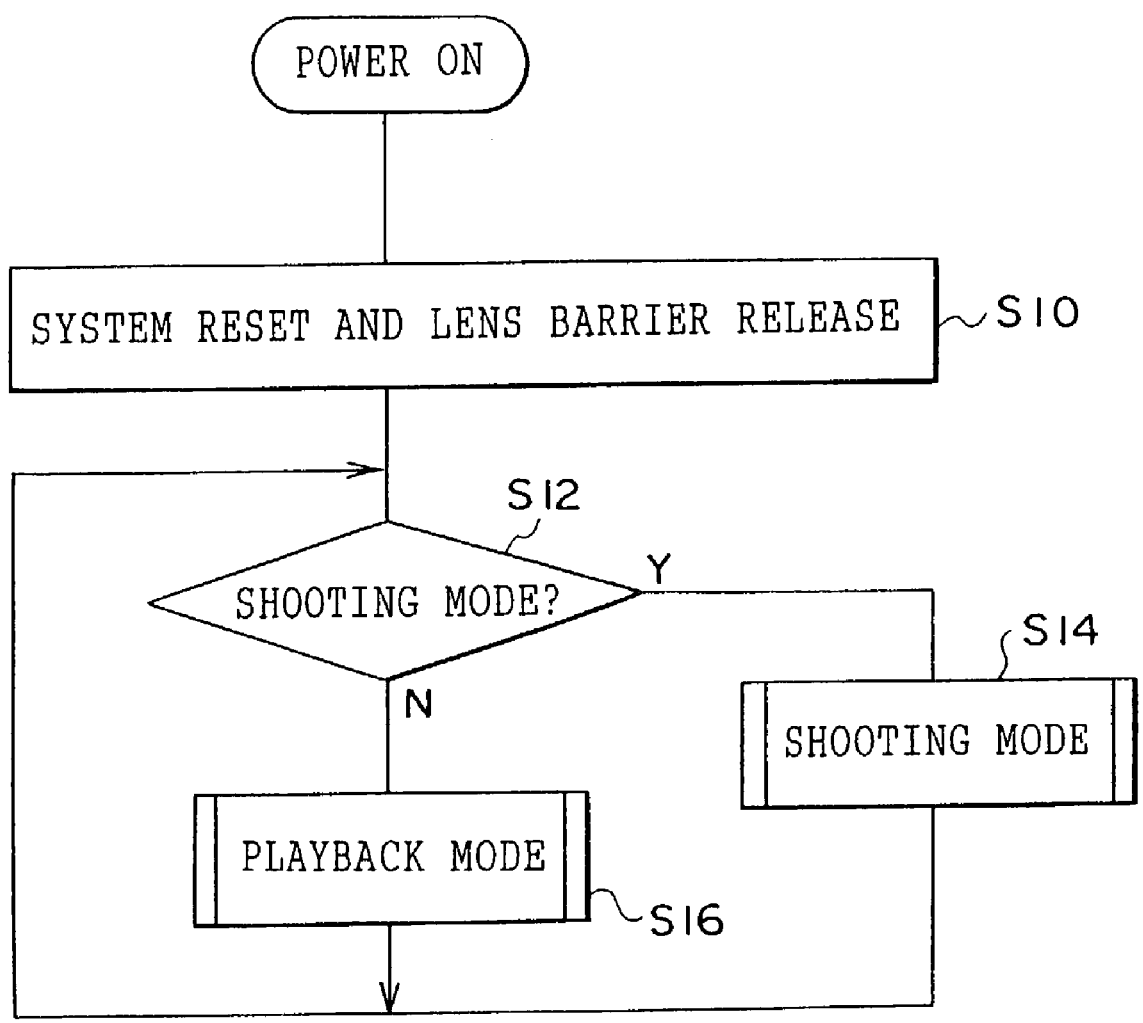
FIG. 7 is a flow chart showing the flow of operations in the camera pertaining to the embodiment of the invention.

FIG. 7 is a flow chart illustrating a "Power On" program that is activated when the power switch 32 shown in FIG. 1 is turned on. Explanation of auto-focus and automatic exposure functions will be omitted.

In step S10, the system is reset and the lens barrier 18a is released when the power switch 32 is turned on.

In step S12, it is determined whether or not the mode currently selected is the shooting mode. When the determination is affirmative, the routine proceeds to step S14 and the shooting mode is activated.

Figure 8:
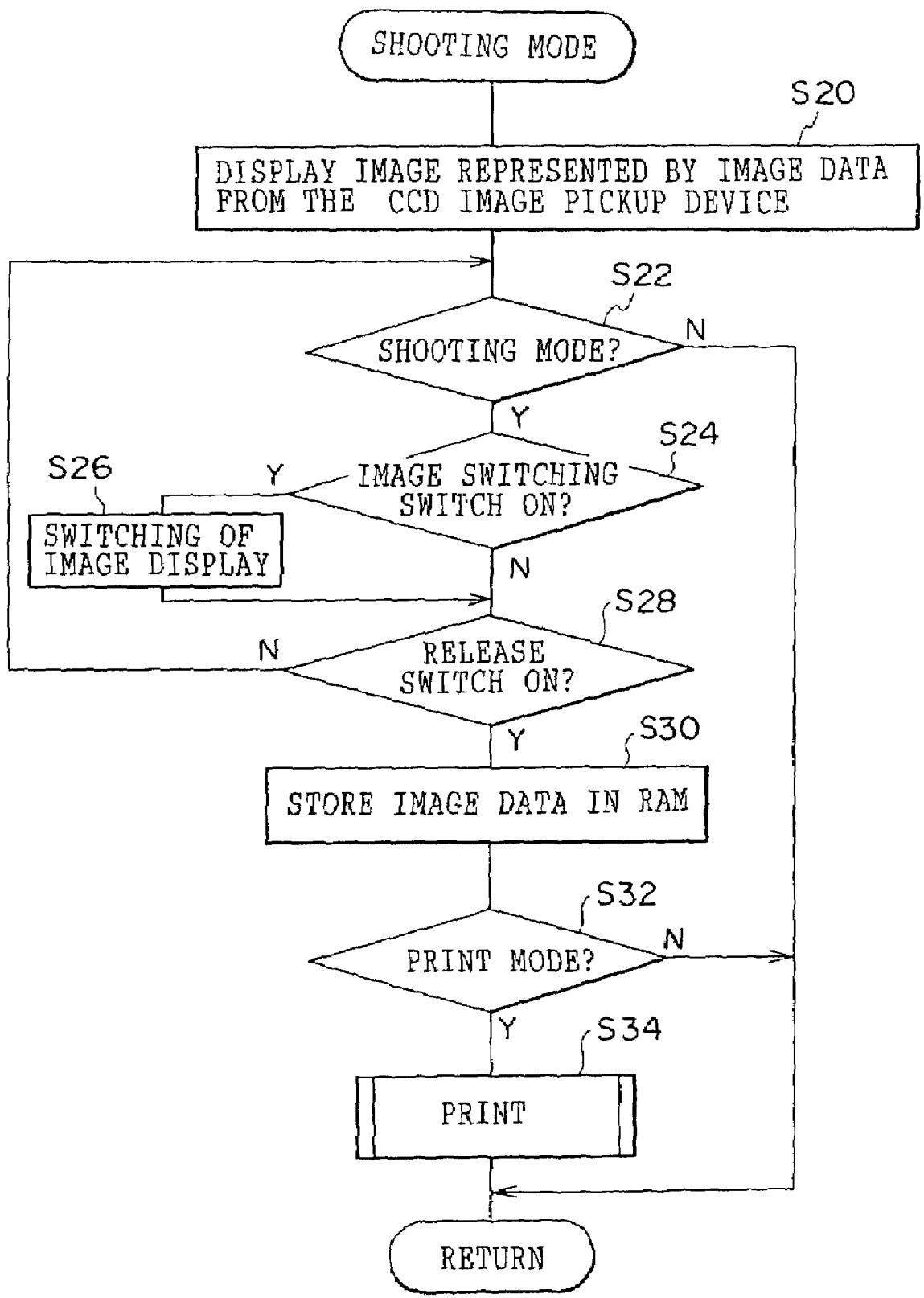
FIG. 8 is a flow chart showing a shooting mode subroutine.

The shooting mode will here be described with reference to the flow chart of FIG. 8.

In step S20, an image represented by image data outputted from the CCD image pickup device 104 is displayed on the image display screen 48 when the shooting mode is activated.

Next, in step S22, it is determined whether or not the current mode is the shooting mode. When the determination is negative, this subroutine is bypassed and the routine returns to step S12 of the "Power On" program.

When the determination in step S22 is affirmative, the subroutine proceeds to step S24, where it is determined whether or not the image switching/playback image selection switch 56 shown in FIG. 2 has been turned on. When the determination is affirmative, the subroutine proceeds to step S26, where the image display is switched to display that which is not currently being displayed of the image display from the CCD image pickup device 104 and system information display such as the shootable number of film sheets, and then the subroutine proceeds to step S28.

When the determination in step S24 is negative, the subroutine proceeds to step S28, where it is determined whether or not the release switch 12 shown in FIG. 1 has been turned on. When the determination is affirmative, the subroutine proceeds to step S30, where image data representing an image that is currently being shot by the CCD image pickup device 104 is stored in the RAM 122, and then the subroutine proceeds to step S32.

When the determination in step S28 is negative, i.e., when the release switch 12 has not been turned on, the subroutine returns to step S22 and the aforementioned processing is repeated.

In step S32, is it determined whether or not the print mode for printing directly after shooting is effected by operation of the print mode selection switch 50 shown in FIG. 2 has been preset. When the determination is negative, this subroutine is bypassed and the routine returns to step S12 of the "Power On" program.

When the determination in step S32 is affirmative, the subroutine proceeds to step S34, where printing (described later) is conducted.

Description will here be given returning to step S12 of the "Power On" program.

When the determination in step S12 is negative, i.e., when it is determined that the mode is not the shooting mode, the routine proceeds to step S16, where the playback mode is activated.

Figure 9:
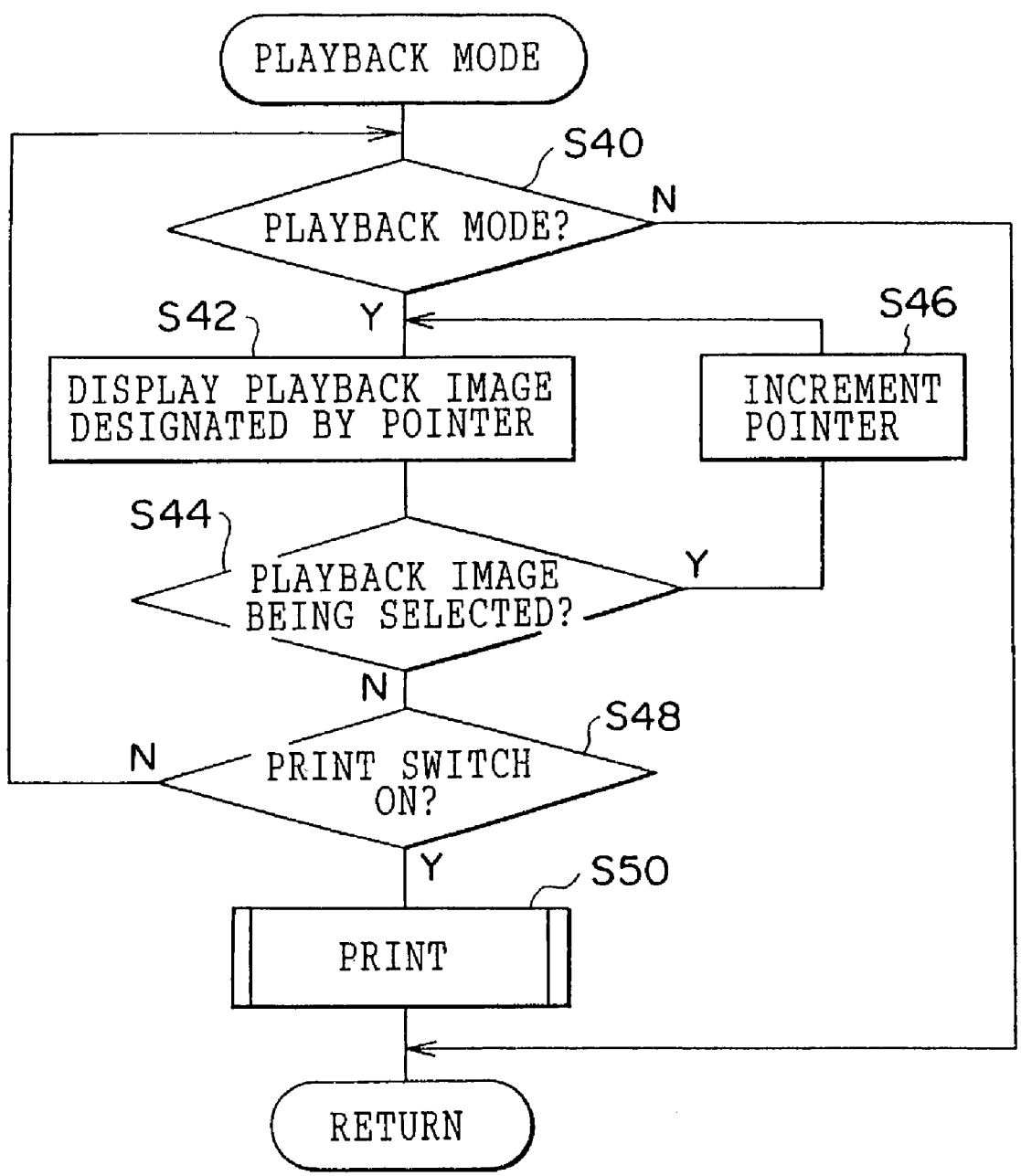
FIG. 9 is a flow chart showing a playback mode subroutine.

Next, description will be given of the playback mode with reference to the flow chart of FIG. 9.

In step S40, it is determined whether or not the current mode is the playback mode. When the determination is negative, this subroutine is bypassed and the routine returns to step S12 of the "Power On" program.

When the determination in step S40 is affirmative, the subroutine proceeds to step S42, where an image that is of already-stored image data and stored at an address currently designated by a pointer representing an address in the RAM 122 is played back and displayed on the image display screen 48, and then the subroutine proceeds to step S44.

In step S44, it is determined whether or not selection of a playback image by the image switching/playback image selection switch 56 is being carried out. When the determination is affirmative, the subroutine proceeds to step S46, where the pointer is incremented so that other stored images are played back and displayed, and then the routine proceeds to step S42.

When the determination in step S44 is negative, the subroutine proceeds to step S48, where it is determined whether or not the print switch 54 show in FIG. 2 has been turned on. When the determination is negative, the subroutine returns to step S40, and when the determination is affirmative, the subroutine proceeds to step S50, where printing (described later) is conducted, and then this subroutine is bypassed and the routine proceeds to step S12 of the "Power On" program.

Figure 10:
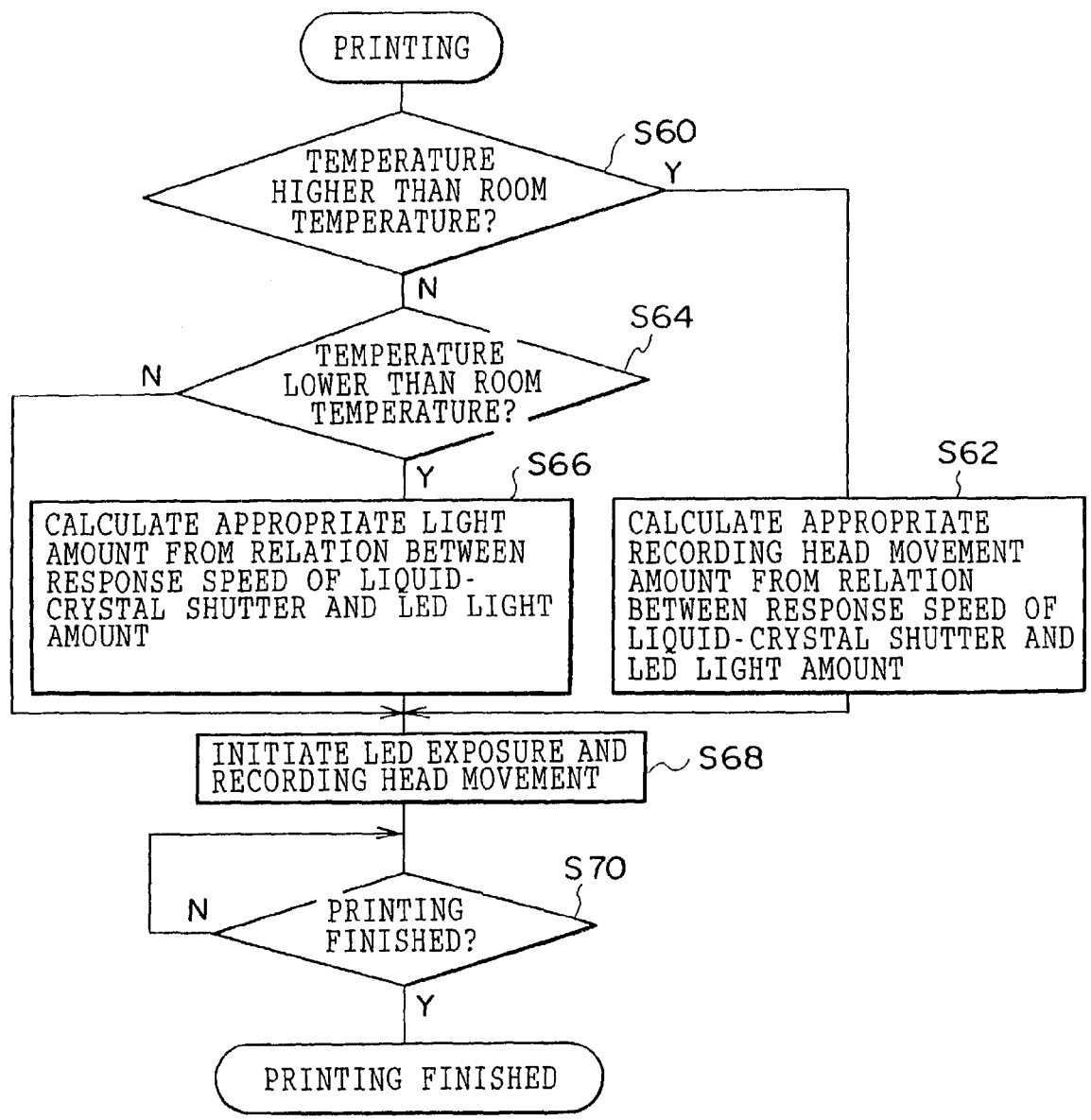
FIG. 10 is a flow chart showing a printing subroutine.

Next, description will be given of printing with reference to the flow chart of FIG. 10.

First, it is determined in step S60 whether or not the detection result of the temperature sensor 96 is a temperature that is higher than room temperature (e.g., 20° C. to 25° C.). When the determination is affirmative, the subroutine proceeds to step S62, where an appropriate recording head movement amount is calculated on the basis of the relation between the exposure amount (LED light amount) and the response speed of the liquid-crystal shutter 84 corresponding to the predetermined temperature, and then the subroutine proceeds to step S68.

When the determination in step S60 is negative, the subroutine proceeds to step S64, where it is determined whether or not the detection result of the temperature sensor 96 is a temperature that is lower than room temperature. When the determination is negative, the subroutine proceeds to step S68, and when the determination is affirmative, the subroutine proceeds to step S66. In step S66, an appropriate light amount is calculated on the basis of the relation between the LED light amount and the response speed of the liquid-crystal shutter 84 corresponding to the predetermined temperature.

In step S68, LED exposure and movement of the recording head 70 are initiated, and printing is effected. Namely, the LEDs 80 emit light, and the film sheet F is exposed by the recording head 70 being moved in the direction of arrow A in FIG. 3.

When exposure is finished, the film sheet F is discharged outside the camera 10. It should be noted that, in printing, the light emission amount of the LEDs 80 is controlled so that light is emitted at a preset light amount at times other than when the temperature is low and controlled so that light is emitted on the basis of the calculation results calculated in step S66 when the temperature is low. Also, the movement amount of the recording head 70 is controlled so that it moves at a predetermined amount at times other than when the temperature is high and controlled so that it moves on the basis of the calculation results calculated in step S62 when the temperature is high.

In step S70, it is determined whether or not printing is finished. The subroutine stands by until printing is finished, and the subroutine concludes when it is determined that printing is finished.

In the present embodiment, exposure of the film sheet F by the respective color LEDs 80 is conducted by successively emitting R, G and B light at respective positions of the recording head 70 and successively moving the recording head 70. However, the invention may be configured so that the recording head 70 is scanned and exposed for each of R, G and B.

Figure 11:
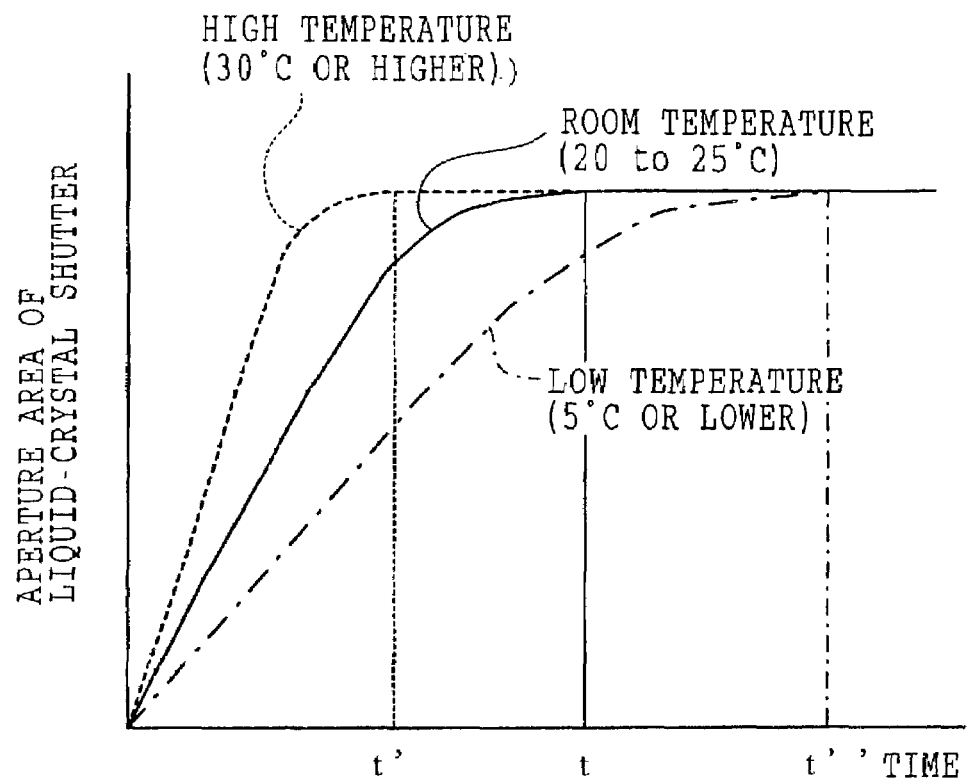
FIG. 11 is a graph showing temperature characteristics of a liquid-crystal shutter.
Figure 12:
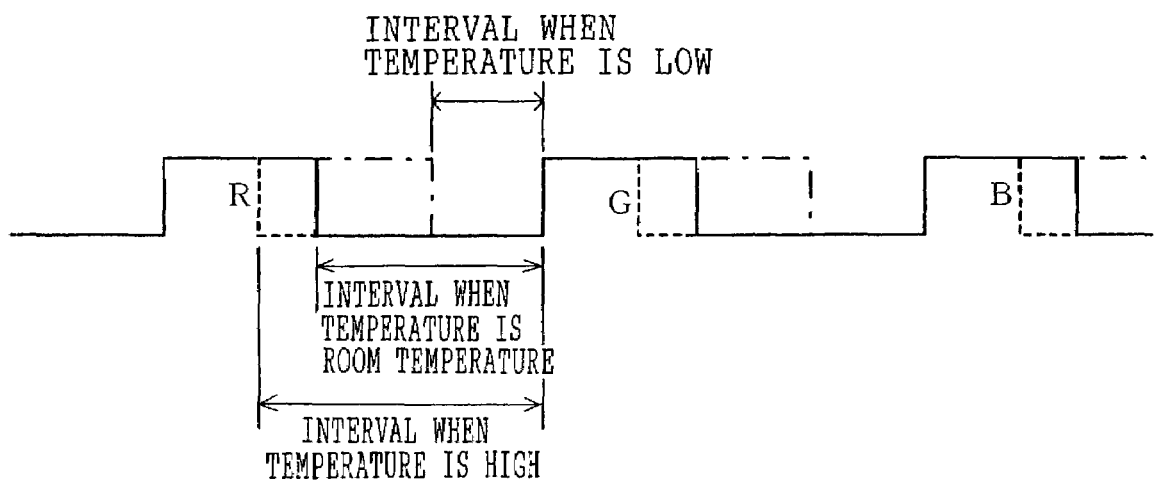
FIG. 12 is a timing chart showing operational timing of the liquid-crystal shutter.

As shown in FIG. 11, the response speed of the liquid-crystal shutter 84 varies depending on changes in temperature, and the time it takes for the aperture to open to the aperture area necessary for exposure varies. A time of t" with respect to a time t that is necessary at room temperature (t<t") becomes necessary when the temperature is low, and a time t' (t>t') becomes necessary when the temperature is high. Namely, the response speed of the liquid-crystal shutter 84 drops when the temperature is low and rises when the temperature is high. Thus, the light amount, which is an integral value of time t" in a characteristic curve between the aperture area of the liquid-crystal shutter 84 and time, varies depending on the temperature. Accordingly, as shown in FIG. 12, when one considers a case where the liquid-crystal shutter 84 opens at a predetermined timing per each of the R, G and B colors, the interval between each color exposure is longer when the temperature is high. Thus, it is possible to increase the moving speed of the recording head 70 the longer the interval when the temperature is high.

In the present embodiment, as described with the above printing, the temperature in the vicinity of the recording head (liquid-crystal shutter 84) 70 is detected by the temperature sensor 96, and when the detected temperature is higher than room temperature, the movement amount of the recording head 70 is calculated from the relation between the LED light amount and the response speed of the liquid-crystal shutter 84 corresponding to the temperature, and the moving speed of the recording head 70 is increased, whereby an appropriate exposure amount is obtained. Thus, exposure at an appropriate exposure amount is possible, and it is possible to conduct printing at a high speed when the temperature is high. Also, when the temperature is lower than room temperature, an appropriate light amount is detected from the relation between the LED light amount and the response speed of the liquid-crystal shutter 84 corresponding to the temperature, and the amount of light emitted by the LEDs 80 is increased, whereby an appropriate exposure amount is obtained. Thus, exposure at an appropriate exposure amount is possible without lowering printing speed.

In the above-described embodiment, an appropriate amount of light is obtained by increasing the moving speed of the recording head 70 when the temperature is high and by increasing the amount of light emitted by the LEDs 80 when the temperature is low. However, the invention is not limited to the same. The invention may be configured so that only the moving speed of the recording head 70 is controlled and changed at low and at high temperatures, or configured so that only the amount of light emitted by the LEDs 80 is controlled and changed at low and at high temperatures.

Namely, when only the moving speed of the recording head 70 is controlled, an appropriate exposure amount can be obtained by making an interval T between each color constant (predetermined time necessary between each color), and, with respect to room temperature (see FIG. 13A), increasing the moving speed when the temperature is high and shortening exposure time (exposure time t1 when the temperature is high: t0>t1), as shown in FIG. 13B, and reducing the moving speed when the temperature is low and lengthening exposure time (exposure time t2 when the temperature is low: t0<t2), as shown in FIG. 13C. In this case, it is possible to conduct printing at a high speed when the temperature is high and to prolong the life of the LEDs 80 if the LEDs 80 emit light at a constant light amount 10.

When only the amount of light emitted by the LEDs 80 is controlled, an appropriate exposure amount can be obtained by lowering the amount of light emitted by the LEDs 80 when the temperature is high (light amount I1 when the temperature is high: I0>I1), as shown in FIG. 13D, and raising the amount of light emitted by the LEDs 80 when the temperature is low (light amount I2 when the temperature is low: I0<I2), as shown in FIG. 13E. In this case, shooting time can be made constant regardless of the temperature.

Because the time of exposure by the liquid-crystal shutter 84 for each color differs in the control of the moving speed and the control of the light amount in this manner, setting means for setting the time of exposure by the liquid-crystal shutter 84 for different colors may be disposed and control of the amount of light emitted by the LEDs 80 and the movement of the recording head 70 may be selectively controlled when many colors are successively exposed with regard to a single pixel.

Figure 15:
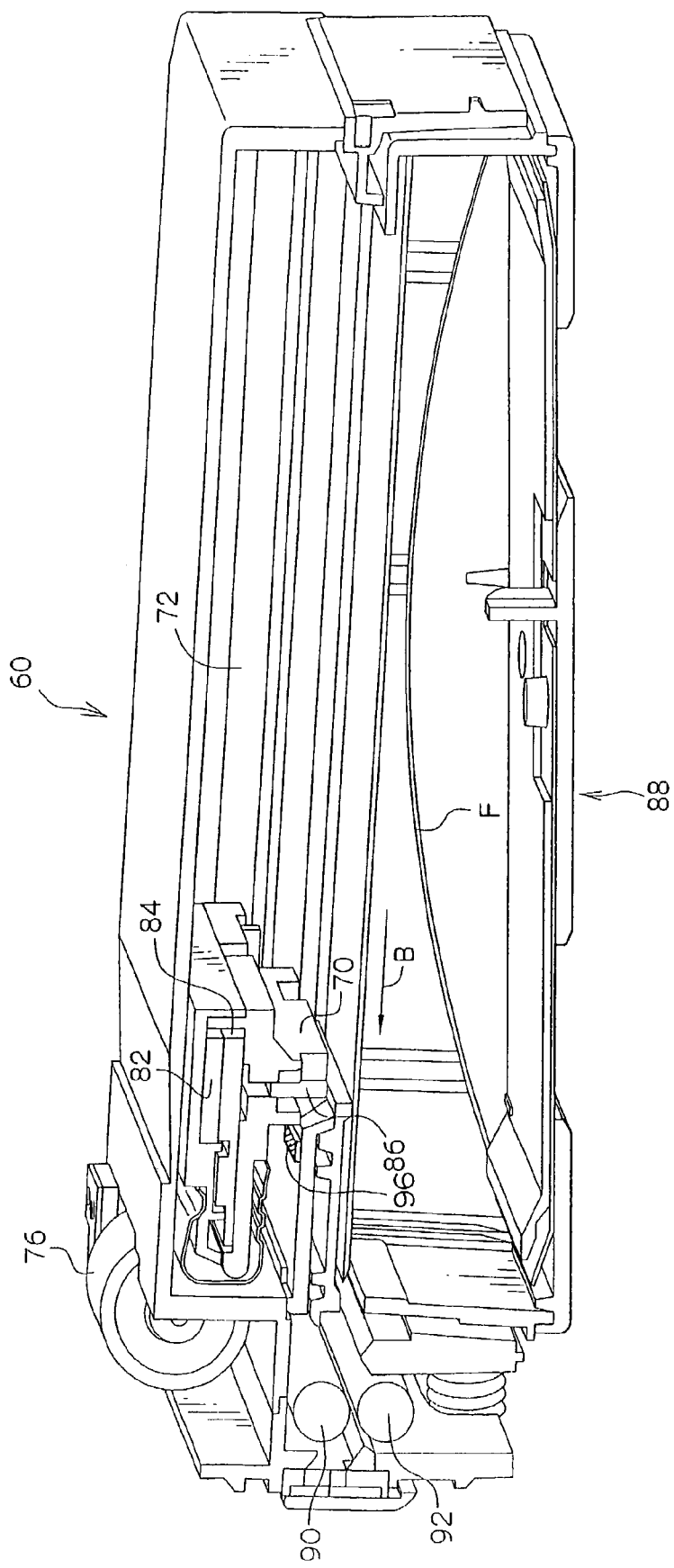
FIG. 15 is a view showing an example of another disposition of the temperature sensor.
Figure 16:
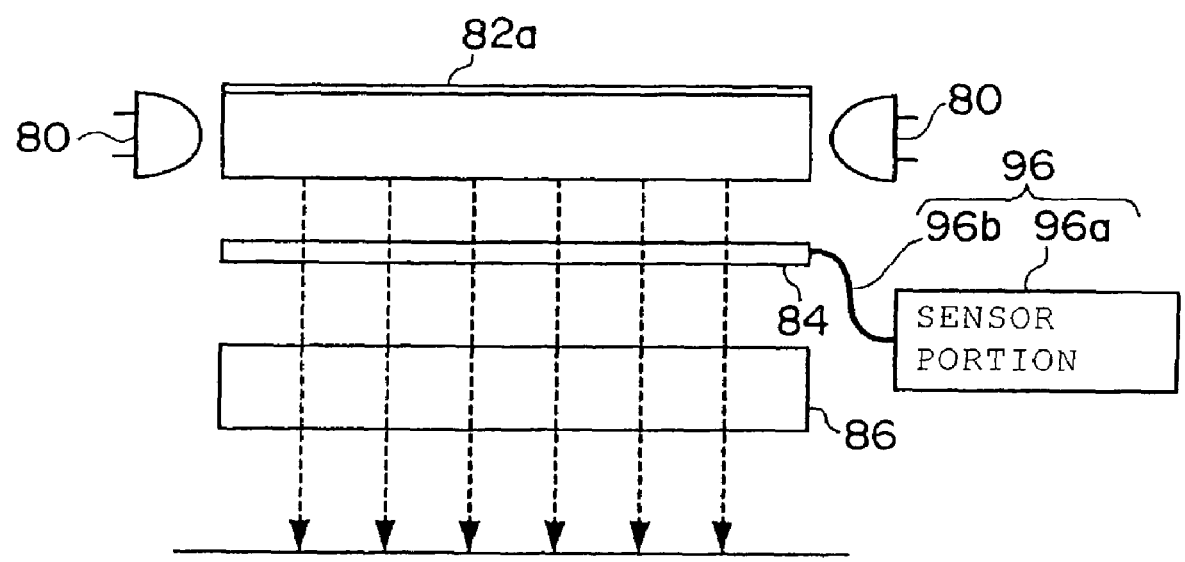
FIG. 16 is a view showing an example of the temperature sensor directly detecting a temperature of the liquid-crystal shutter.

In the above-described embodiment, the temperature sensor 96 was disposed at the FPC 94 near the recording head 70 and the temperature of the liquid-crystal shutter 84 was detected indirectly. However, the present invention is not limited to the same. The temperature sensor 96 may be disposed anywhere, such as on the recording head 70, so long as it is a place where the temperature sensor 96 can detect the temperature of the liquid-crystal shutter 84, or at a position at which it detects the temperature of the liquid-crystal shutter 84 indirectly or at a position at which it detects the temperature of the liquid-crystal shutter 84 directly. For example, as shown in FIG. 14, the temperature sensor 96 may be disposed on the recording head 70 and the temperature of the liquid-crystal shutter 84 may be detected indirectly by detecting the temperature of the recording head 70, the temperature surrounding the recording head 70, or the temperature surrounding the liquid-crystal shutter 84. Alternatively, the temperature sensor 96 may be disposed inside the printer device 60, as in the position shown in FIG. 15, and the temperature of the liquid-crystal shutter 84 may be detected indirectly. The temperature sensor 84 may also directly detect the temperature of the liquid-crystal shutter 84, as shown in FIG. 16. In FIG. 16, in order to directly detect the temperature of the liquid-crystal shutter 84, the temperature sensor 96 comprises a sensor part 96a and a flexible cable 96b made of a material having a high coefficient of thermal conductivity. The temperature of the liquid-crystal shutter 84 is directly detected by the sensor part 96a via the flexible cable 96b. Accordingly, it becomes possible to directly detect the temperature of the liquid-crystal shutter 84. The temperature sensor 96 may also be directly disposed at a position on a side surface (surfaces at which the LEDs 80 shown in FIG. 16 are disposed) of the liquid-crystal shutter 84 to thereby directly detect the temperature of the liquid-crystal shutter 84. It should be noted that, similar to the aforementioned embodiment, exposure at an appropriate exposure amount become possible by setting the room temperature value in steps S60 and S62 in response to the above respective positions at which the temperature sensor 96 is disposed.

In the above embodiment, a configuration in which a liquid-crystal shutter is used has been described. However, the present invention is not limited to the described configuration. Any shutters, which are known in the art or will be invented in the future, can be employed as the shutter of the present invention. Further, the present invention can be configured such that organic EL elements, each being integrally formed with a reflective mirror, are provided and control of exposure/non-exposure of regions on the object to be irradiated is conducted by selectively driving the organic EL elements to emit light.

What is claimed is:

1. A printer device comprising:
    a recording head including a light source for irradiating a photosensitive material with light and a shutter disposed between the light source and the photosensitive material for controlling irradiation of the light with respect to the photosensitive material on the basis of image data representing an image;
    a moving section for relatively moving the recording head and the photosensitive material;
    a detection section for detecting a temperature of the shutter; and
    a control section for controlling at least one of an amount of light irradiated by the light source and a movement amount by the moving section on the basis of the detection result of the detection section;
    wherein the control section controls the amount of light irradiated by the light source when the detection result of the detection section is smaller than a predetermined range and controls the movement amount by the moving section when the detection result of the detection section is greater than the predetermined range.

2. The printer device of claim 1, wherein the control section controls at least one of the light amount and the movement amount on the basis of a relation between the amount of light irradiated by the light source and a response speed of the shutter that is dependent upon temperature.

3. The printer device of claim 1, wherein the detection section directly detects the temperature of the shutter.

4. The printer device of claim 1, wherein the detection section indirectly detects the temperature of the shutter.

5. The printer device of claim 4, wherein the detection section detects a temperature in the vicinity of the shutter.

6. The printer device of claim 4, wherein the detection section detects a temperature of the recording head.

7. The printer device of claim 4, wherein the detection section detects a temperature inside the printer device.

8. The printer device of claim 1, wherein the shutter includes a liquid-crystal shutter.

9. A printer device comprising:
    a recording head including a light source for irradiating a photosensitive material with light and a shutter disposed between the light source and the photosensitive material for controlling irradiation of the light with respect to the photosensitive material on the basis of image data representing an image;
    a moving section for relatively moving the recording head and the photosensitive material;
    a detection section for detecting a temperature in a vicinity of the recording head; and
    a control section for controlling at least one of an amount of light irradiated by the light source and a movement amount by the moving section on the basis of the detection result of the detection section;
    wherein the control section controls the amount of light irradiated by the light source when the detection result of the detection section is smaller than a predetermined range and controls the movement amount by the moving section when the detection result of the detection section is greater than the predetermined range.

10. The printer device of claim 9, wherein the control section controls at least one of the light amount and the movement amount on the basis of a relation between the amount of light irradiated by the light source and a response speed of the shutter that is dependent upon temperature.

11. The printer device of claim 9, wherein the shutter includes a liquid-crystal shutter.

* * * * *